United States Patent
Mizuno (10) Patent No.: US 11,046,223 B2
(45) Date of Patent: Jun. 29, 2021

(54) ARMREST FOR VEHICLE

(71) Applicant: TOYOTA BOSHOKU KABUSHIKI KAISHA, Aichi (JP)

(72) Inventor: Yuki Mizuno, Aichi-ken (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 66 days.

(21) Appl. No.: 16/653,114

(22) Filed: Oct. 15, 2019

(65) Prior Publication Data

US 2020/0122617 A1 Apr. 23, 2020

(30) Foreign Application Priority Data

Oct. 22, 2018 (JP) .............................. JP2018-198433

(51) Int. Cl.
*B60N 2/75* (2018.01)
*B60N 2/42* (2006.01)
*B60R 21/04* (2006.01)

(52) U.S. Cl.
CPC .............. *B60N 2/78* (2018.02); *B60N 2/4235* (2013.01); *B60R 21/0428* (2013.01); *B60R 2021/0414* (2013.01)

(58) Field of Classification Search
CPC ........ B60N 2/78; B60N 2/75; B60N 13/0243; B60R 2021/0006; B60R 2021/0414; B60R 21/0428
USPC ................................... 296/1.09, 187.05, 453
See application file for complete search history.

(56) References Cited

U.S. PATENT DOCUMENTS

| | | | | |
|---|---|---|---|---|
| 5,433,478 A | * | 7/1995 | Naruse | ................ B60R 21/0428 280/751 |
| 2006/0001291 A1 | * | 1/2006 | Dooley | .................... B60N 2/78 296/153 |
| 2009/0179454 A1 | * | 7/2009 | Saida | .................. B60R 21/0428 296/146.7 |
| 2018/0186323 A1 | * | 7/2018 | Tallapragada | ...... B60R 21/0428 |
| 2018/0222365 A1 | * | 8/2018 | Shimizu | ................. B60N 2/797 |
| 2019/0375323 A1 | * | 12/2019 | Vemulapati | .............. B60N 2/75 |

FOREIGN PATENT DOCUMENTS

JP        2004291828 A        10/2004

* cited by examiner

*Primary Examiner* — Jason S Morrow
(74) *Attorney, Agent, or Firm* — Greenblum & Bernstein, P.L.C.

(57) ABSTRACT

An armrest includes a protruded section extending in a vehicular front-rear direction and protruded toward a vehicular interior side, and the protruded section includes an upper section, a lower section, and an intermediate section that is between the upper section and the lower section and connects the upper section and the lower section on a vehicular interior side. The armrest further includes ribs that are on a vehicular exterior side with respect to the intermediate section and arranged in the vehicular front-rear direction and each of the ribs extends from the upper section to the lower section. The ribs include a low rigidity rib and a high rigidity rib that are arranged next to each other in the vehicular front-rear direction, and the high rigidity rib having rigidity higher than that of the low rigidity rib.

16 Claims, 7 Drawing Sheets

ARMREST FOR VEHICLE

CROSS REFERENCE TO RELATED APPLICATION

This application claims priority from Japanese Patent Application No. 2018-198433 filed on Oct. 22, 2018. The entire contents of the priority application are incorporated herein by reference.

TECHNICAL FIELD

The technology described herein relates to an armrest for a vehicle.

BACKGROUND

An armrest for a vehicle includes ribs on back surfaces of an upper surface section and a side surface section of the armrest as a reinforcing member. Each of the ribs extends in a vehicular width direction over an entire width area of the back surfaces and the ribs are arranged in a vehicular front-rear direction. According to such a configuration, an impact force that is applied from a lateral side section of the armrest is concentrated on a certain portion of the armrest.

With the configuration of the above armrest, the energy released during the side collision is less likely to be absorbed by the ribs. If a force is applied to the ribs due to the side collision, the ribs may be broken at once and the collision energy may not be absorbed step by step.

SUMMARY

The technology described herein was made in view of the above circumstances. An objective of the technology described herein is to provide an armrest for a vehicle that can absorb impact effectively.

An armrest according to the present technology is mounted in a door trim of a vehicle having a vehicular interior surface, and the armrest includes a protruded section protruded from the vehicular interior surface toward a vehicular interior side and extending in a vehicular front-rear direction, and ribs. The protruded section includes an upper section disposed on an upper side, a lower section disposed on a lower side, an intermediate section disposed between the upper section and the lower section and connecting the upper section and the lower section on a vehicular interior side. The ribs are disposed on a vehicular exterior side with respect to the intermediate section and arranged in the vehicular front-rear direction and each of the ribs extends from the upper section to the lower section. The ribs include a low rigidity rib and a high rigidity rib that are arranged in the vehicular front-rear direction, and the high rigidity rib has rigidity higher than that of the low rigidity rib.

DETAILED DESCRIPTION

One embodiment of the present technology will be described with reference to FIGS. 1 to 5. In the present embodiment, an armrest (armrest for a vehicle) 10 that is mounted in a door trim 1 of a vehicle will be described as an example. Arrows FR and RR represent a vehicular front side and a vehicular rear side, respectively, and arrows T and B represent an upper side and a lower side, respectively. Arrows IN and OUT represent a vehicular interior side and a vehicular exterior side, respectively.

Figure 1:
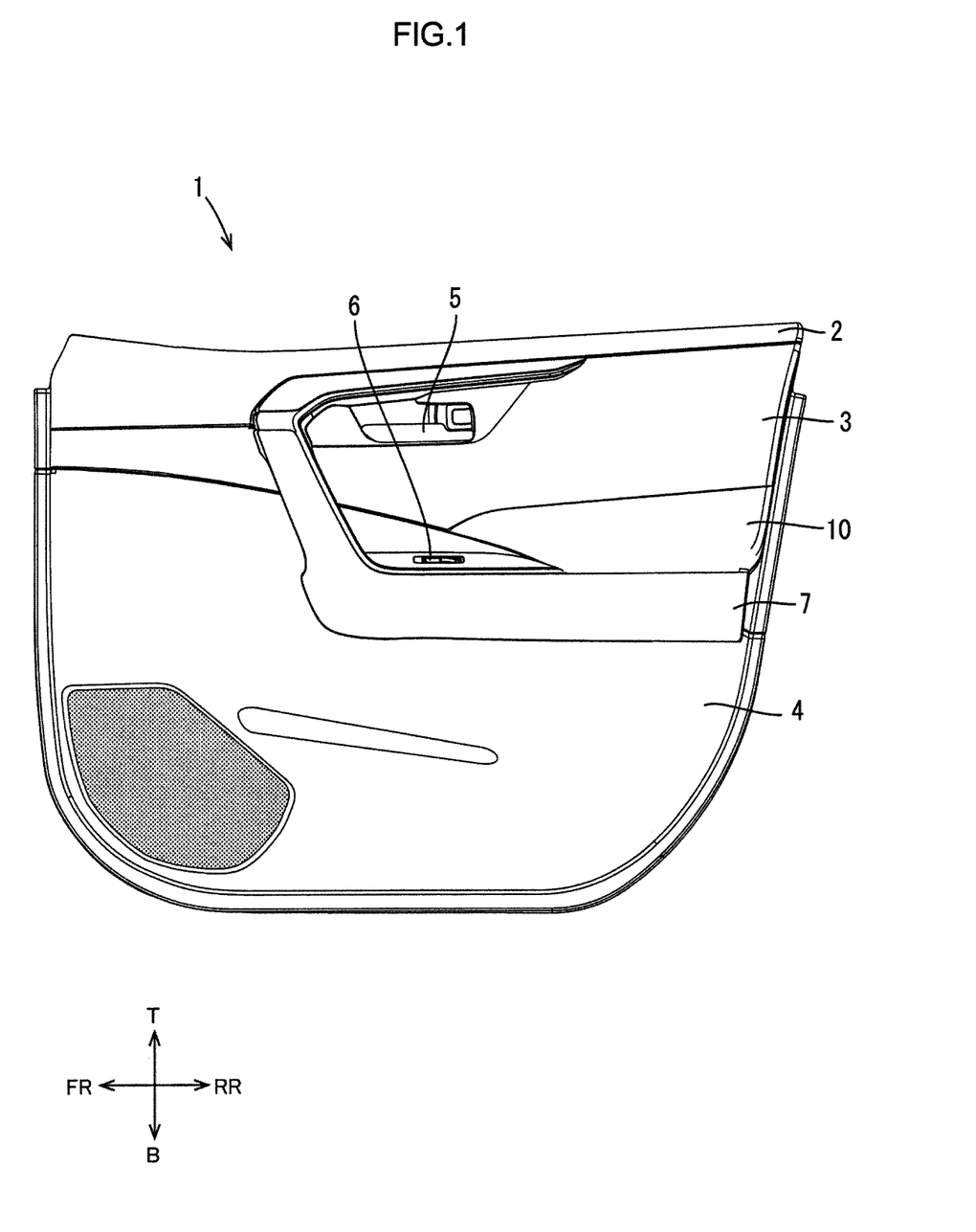
FIG. 1 is an elevation view of a door trim according to an embodiment seen from a vehicular interior side.

The door trim 1 is a plate member made of resin, and as illustrated in FIG. 1, the door trim 1 includes an upper board 2 that is an upper portion of the door trim 1, a middle board 3 that is a middle portion of the door trim and is disposed below the upper board 2, and a lower board 4 that is a lower portion of the door trim 1 and is disposed below the middle board 3. The door trim 1 includes an inside handle 5 for opening and closing a door from the vehicular interior side, a switch base 6 that includes a switch for moving up and down a window, and a decoration panel 7 that has a plate shape extending from a middle portion to a rear portion of the door trim 1 and is mounted from the vehicular interior side. The door trim 1 includes the armrest 10 on a vehicular rear side with respect to the middle portion thereof and between the middle board 3 and the lower board 4. The armrest 10 extends in the vehicular front-rear direction and is made of a curved plate.

Figure 2:
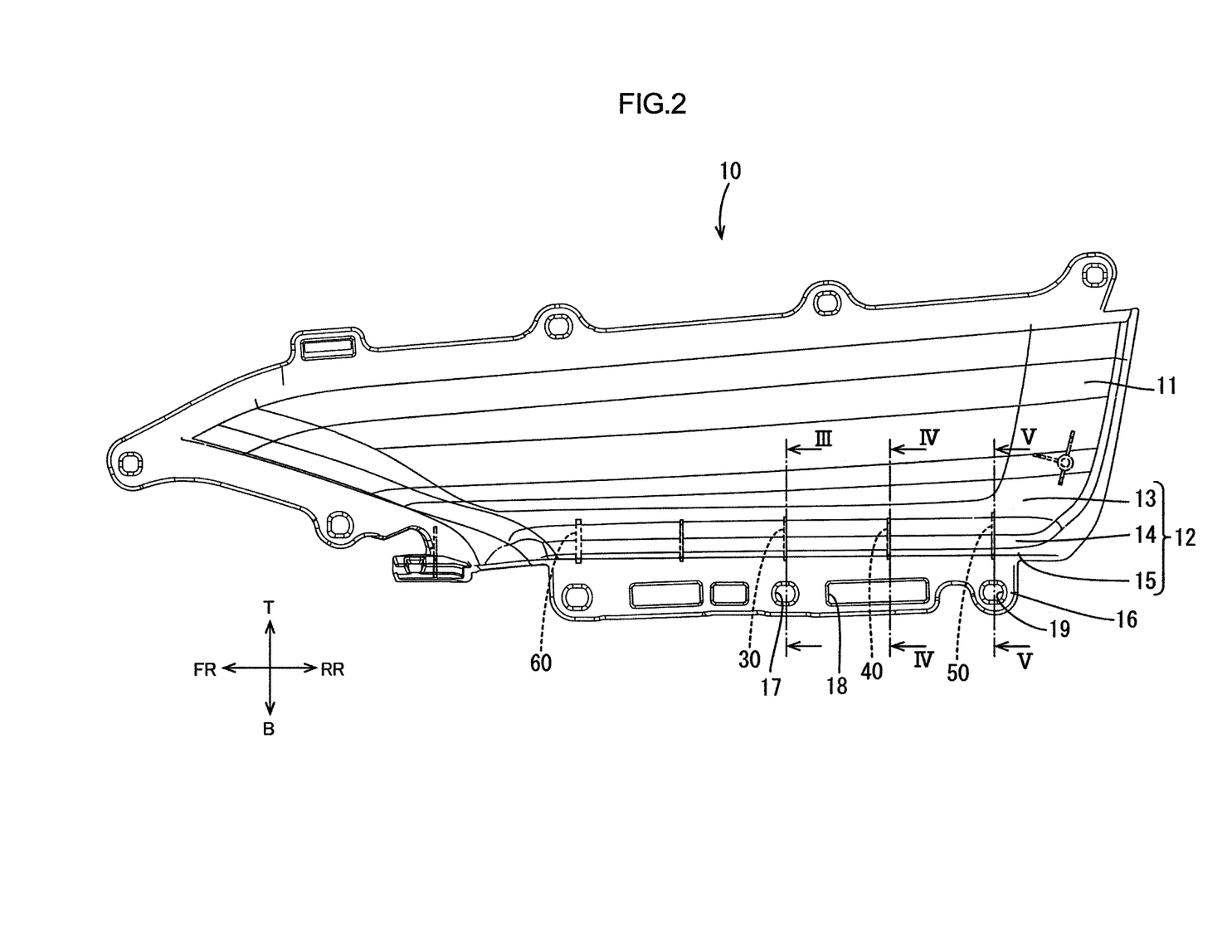
FIG. 2 is an elevation view of an armrest seen from the vehicular interior side.
Figure 3:
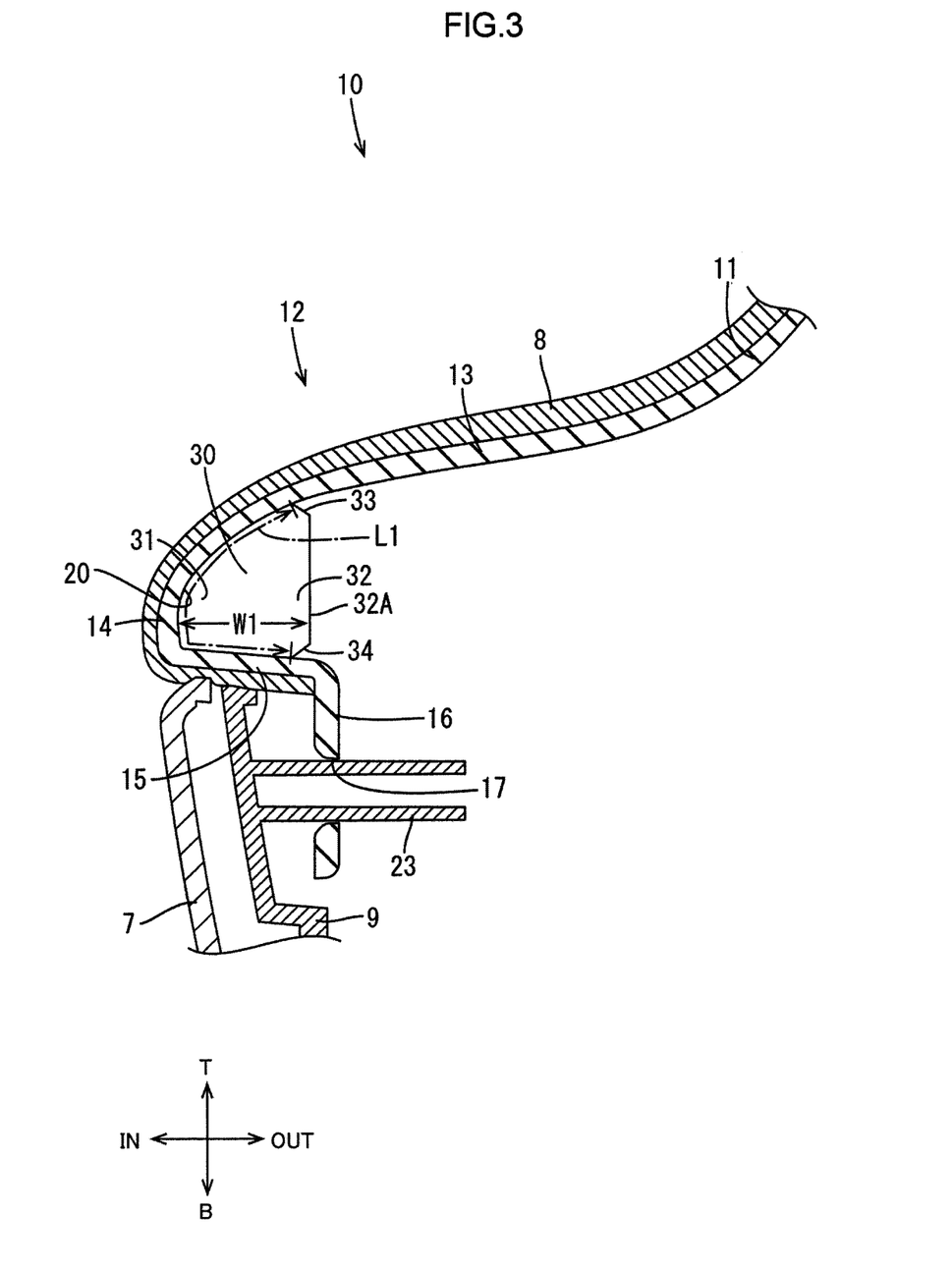
FIG. 3 is a cross-sectional view of the armrest taken along line in FIG. 2.

As illustrated in FIG. 2, the armrest 10 includes a side wall section 11, a protruded section 12, and an extended mount section 16. The side wall section 11 is an upper portion of the armrest 10 and on an upper side with respect to a middle portion thereof in a vertical direction. The side wall section 11 is a plate member extending in the vehicular front-rear direction and in the vertical direction. The side wall section 11 is substantially parallel to the middle board 3. The protruded section 12 extends continuously from the side wall section 11 toward the lower board 4 and is below the side wall section 11. The protruded section 12 extends in the vehicular front-rear direction and protrudes from the side wall section 11 toward the vehicular interior side in a round shape or a substantially U-shape. The protruded section 12 protrudes from a vehicular interior surface of the door trim 1 toward the vehicular interior side. An occupant in a vehicle can put his/her arm on an upper surface of the protruded section 12. As illustrated in FIG. 3, a skin 8 is put on vehicular interior surfaces of the side wall section 11 and the protruded section 12 to cover substantially entire areas of the surfaces. The skin 8 is not illustrated in FIG. 2.

As illustrated in FIGS. 2 and 3, the protruded section 12 includes an upper section 13, an intermediate section 14, and a lower section 15. The upper section 13 is an upper portion of the protruded section 12 and the lower section 15 is a lower portion of the protruded section 12. The intermediate section 14 connects the upper section 13 and the lower section 15 at the most vehicular interior side or at a protruded end of the protruded section 12. The upper section 13 extends from a lower edge of the side wall section 11 downwardly and toward the vehicular interior side in a round shape. A vehicular interior side edge of the upper section 13 is continuous to the intermediate section 14 so as to be curved downwardly in a round shape. An occupant's arm can be put on the upper section 13 that extends substantially laterally in the vehicular width direction and has a gentle slope surface. The intermediate section 14 is continuous from the vehicular interior side edge of the upper section 13 at the upper edge thereof and is continuous to the vehicular interior side edge of the lower section 15 at the lower edge thereof. The intermediate section 14 is at the most vehicular interior side in the armrest 10. The lower section 15 extends from a lower edge of the intermediate section 14 substantially in a vehicular width direction toward the vehicular exterior side. Each of the upper section 13, the intermediate section 14, and the lower section 15 extends longitudinally in the vehicular front-rear direction, and the upper section 13, the intermediate section 14, and the lower section 15 integrally form a unitary part that is the protruded section 12.

Figure 4:
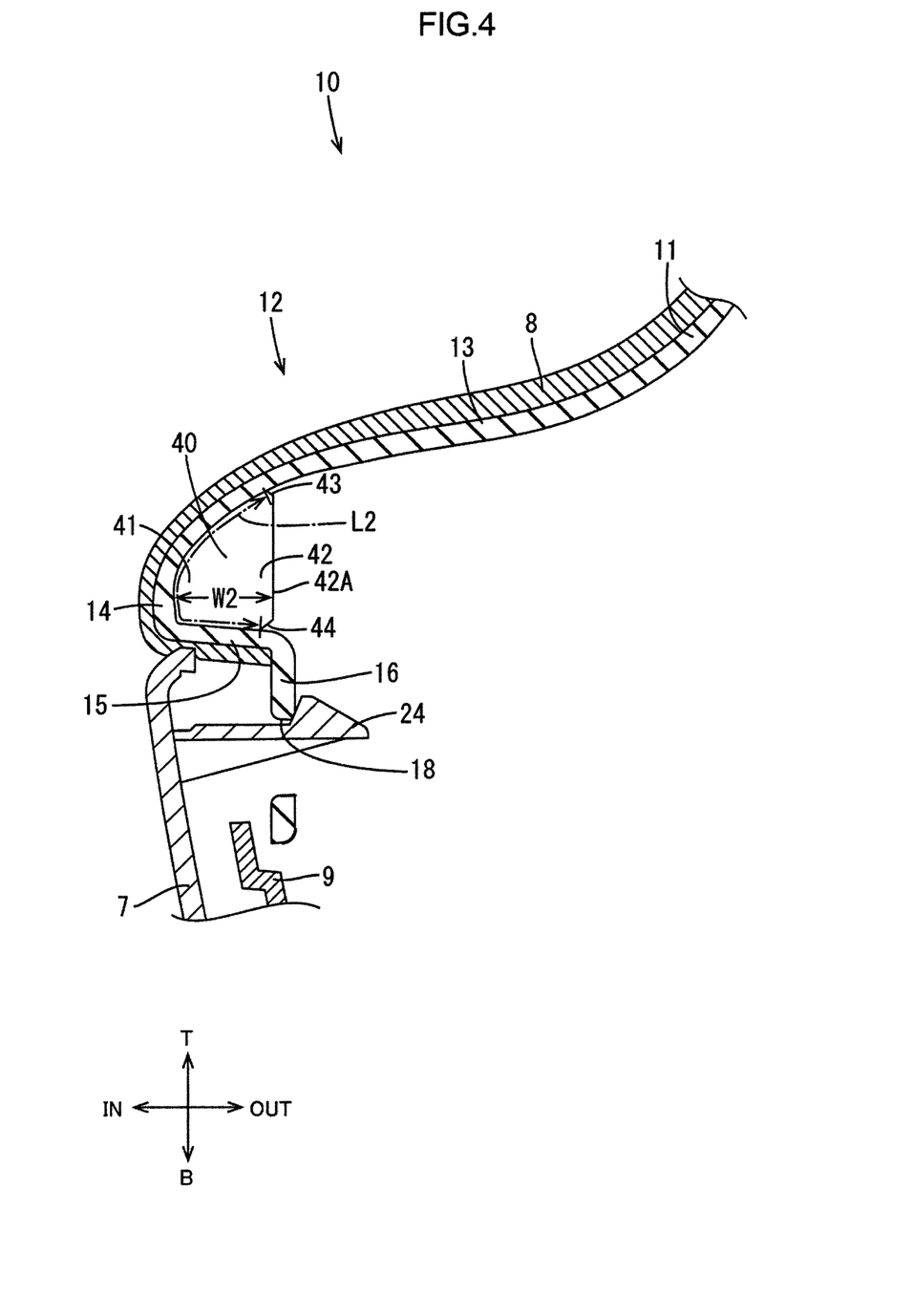
FIG. 4 is a cross-sectional view of the armrest taken along line IV-IV in FIG. 2.
Figure 5:
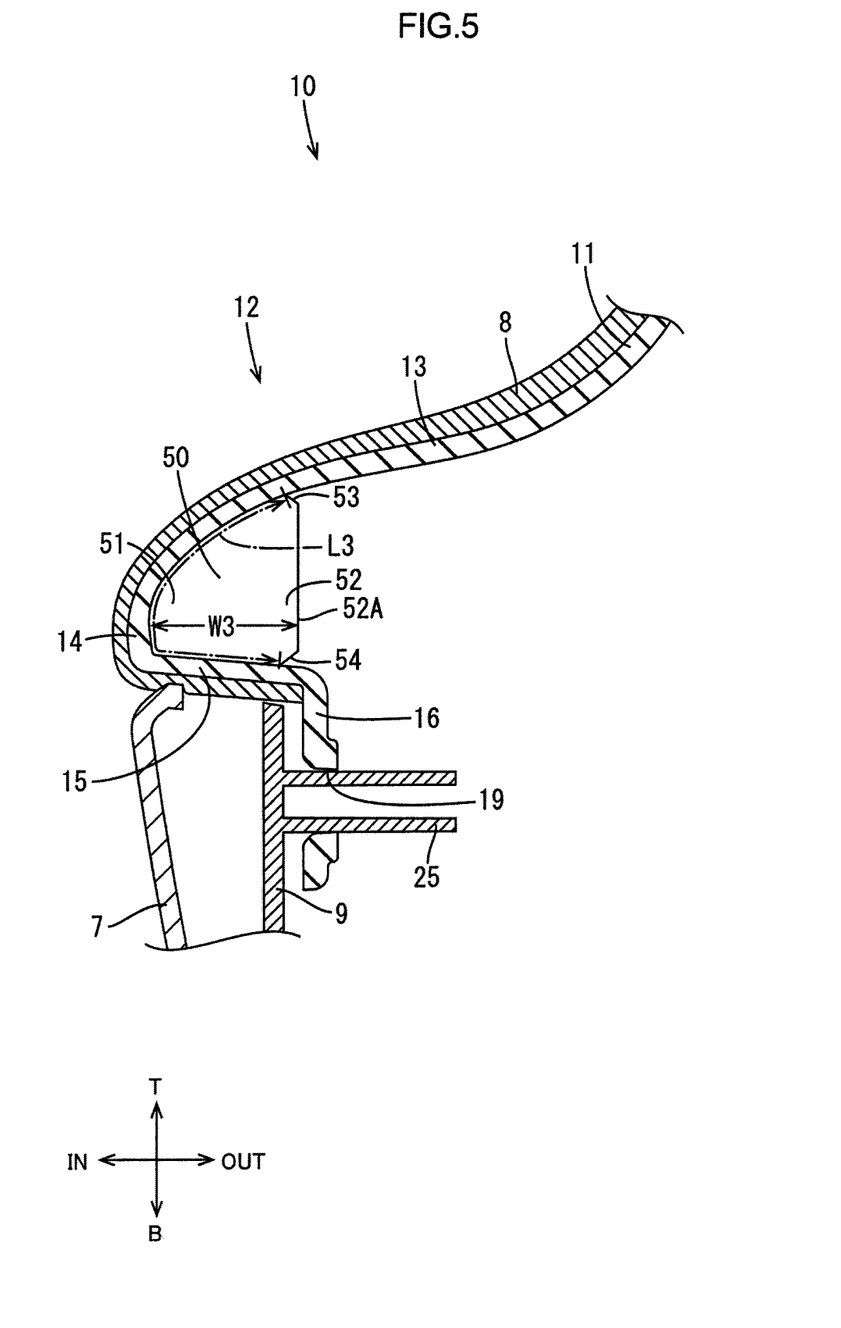
FIG. 5 is a cross-sectional view of the armrest taken along line V-V in FIG. 2 and illustrating an intermediate stopper projection that is in an intermediate stopper hole.

The extended mount section 16 is disposed below the protruded section 12 and extends downwardly from the vehicular interior side edge of the lower section 15. The extended mount section 16 includes holes 17, 18, 19 that are through the extended mount section 16 in a thickness direction thereof (in the vehicular width direction) and are arranged in the vehicular front-rear direction. As illustrated in FIGS. 3 to 5, the armrest 10 is mounted in the decoration panel 7 and an inner panel 9 with bosses 23, 25 and a stopper 24 that are inserted through the holes 17, 19, 18, respectively. Accordingly, the armrest 10 is fixed to the decoration panel 7 and the inner panel 9 through the holes 17, 18, 19 of the extended mount section 16.

As illustrated in FIGS. 2 to 5, the protruded section 12 has a recessed section 20 on the vehicular exterior side thereof, and the recessed section 20 is defined by a vehicular exterior side surface of the protruded section 12 and specifically, the recessed section 20 is surrounded by the upper section 13, the intermediate section 14, and the lower section 15. Ribs 30, 40, 50 are in the recessed section 20 such that outer peripheral edge surfaces thereof are contacted with the upper section 13, the intermediate section 14, and the lower section 15. The ribs 30, 40, 50 are arranged in the vehicular front-rear direction. Namely, each of the ribs 30, 40, 50 extends over a space between the upper section 13, the intermediate section 14, and the lower section 15. Each of the ribs 30, 40, 50 is integrally formed with the protruded section 12. The ribs 30, 40, 50 support the armrest 10.

Each of the ribs 30, 40, 50 is a thin plate member that extends in the vertical direction and the vehicular width direction on the back surface side (the vehicular exterior side) of the protruded section 12. A thickness direction of the ribs 30, 40, 50 matches the vehicular front-rear direction. The ribs 30, 40, 50 are arranged so as to overlap the holes 17, 18, 19, respectively, with respect to the vertical direction. Namely, ribs 30, 40, 50 are directly above the respective holes 17, 18, 19. The ribs 30, 40, 50 are disposed in a front portion, a middle portion, and a rear portion of the protruded section 12, respectively, with respect to the vehicular front-rear direction.

Vehicular interior side peripheral edge portions 31, 41, 51 of the respective ribs 30, 40, 50 are continuous from the vehicular exterior side surfaces of the upper section 13, the intermediate section 14, and the lower section 15 of the protruded section 12. On the other hand, vehicular exterior side peripheral edge portions 32, 42, 52 of the respective ribs 30, 40, 50 are not continuous to any other parts. Namely, each of the ribs 30, 40, 50 extends vertically from the upper section 13 to the lower section 15 on the vehicular exterior side of the intermediate section 14.

Each of the ribs 30, 40, 50 has a perimeter length that extends from the upper section 13 to the lower section 15 via the intermediate section 14. The perimeter length of each rib extends along the upper section 13, the intermediate section 14, and the lower section 15 and is referred to as a vehicular interior side peripheral length L1, L2, L3 for each of the ribs 30, 40, 50. The vehicular interior side peripheral lengths L1, L2, L3 correspond to perimeter lengths of the vehicular interior side peripheral edge portions 31, 41, 51 of the ribs 30, 40, 50, respectively. Namely, the vehicular interior side peripheral lengths L1, L2, L3 correspond to the respective perimeter lengths of the vehicular interior side peripheral edge portions 31, 41, 51 that are contacted with the vehicular exterior side surface of the protruded section 12.

The rib 30 that is disposed in the vehicular front portion of the armrest 10 has the vehicular interior side peripheral length L1 that is greater than the vehicular interior side peripheral length L2 of the rib 40 that is disposed in the middle portion of the armrest 10. The rib 50 that is disposed in the vehicular rear portion of the armrest 10 has the vehicular interior side peripheral length L3 that is greater than the vehicular interior side peripheral length L2 of the rib 40 that is disposed in the middle portion of the armrest 10.

The ribs 30, 50 that have greater vehicular interior side peripheral lengths L1 and L3 than the vehicular interior side peripheral length L2 of the rib 40 have higher rigidity than that of the rib 40. Therefore, on the vehicular exterior side of the intermediate section 14, the ribs (high rigidity ribs) 30, 50, which have relatively high rigidity, and the rib (low rigidity rib) 40, which has relatively low rigidity, are arranged alternately in the vehicular front-rear direction. In other words, each of the high rigidity ribs 30, 50 has a larger area or a greater width in the vehicular width direction than those of the low rigidity rib 40. Accordingly, the rigidity of the ribs 30, 50 is higher than that of the rib 40. The distance in the width direction of the rib is defined as a greatest width dimension in the vehicular width direction. As illustrated in FIGS. 3 to 5, the ribs 30, 40, 50 have widths W1, W2, W3, respectively, and the widths W1, W3 are greater than the width W2.

As illustrated in FIGS. 3 to 5, the ribs 30, 40, 50 have chamfered edges at corners and slits 33, 34, 43, 44, 53, 54 are formed between the vehicular exterior side peripheral edge portion 32, 42, 52 and each of the upper section 13 and the lower section 15. The slits 33, 34 that are included in the high rigidity rib 30 will be described with reference to FIG. 3. The rib 30 has the slits 33, 34 on upper and lower portions of the vehicular exterior side peripheral edge portion 32. The rib 30 has the chamfered edges on corner sections thereof on the vehicular exterior side thereof. Accordingly, the corner sections of the rib 30 at the chamfered edges are not contacted with and spaced from the vehicular exterior side surface of the armrest 10. Therefore, the rib 30 includes a recess at the slits 33, 34 on a vehicular exterior side surface 32A of the vehicular exterior side peripheral edge portion 32. The recess extends in a direction perpendicular to a plate surface of the rib 30 or in a thickness direction of the rib 30 or the vehicular front-rear direction.

As illustrated in FIGS. 4 and 5, the low rigidity rib 40 includes the slits 43, 44 and the high rigidity rib 50 includes the slits 53, 54. Configurations of the slits 43, 44, 53, 54 are similar to those of the slits 33, 34 of the rib 30.

As described before, the armrest 10 that is mounted in the door trim 1 of a vehicle according to the present embodiment includes the protruded section 12 that is elongated in the vehicular front-rear direction and protrudes from the vehicular interior surface of the door trim 1 toward the vehicular interior side. The protruded section 12 includes the upper section 13 on the upper side, the lower section 15 on the lower side, and the intermediate section 14 that connects the upper section 13 and the lower section 15 on the vehicular interior side. The armrest 10 includes the ribs 30, 40, 50 on the vehicular exterior side of the intermediate section 14 so as to extend from the upper section 13 to the lower section 15. The ribs 30, 40, 50 are arranged in the vehicular front-rear direction. The ribs 30, 40, 50 include the low rigidity rib 40 and the high rigidity ribs 30, 50 that have rigidity higher than that of the low rigidity rib 40. The low rigidity rib 40 and the high rigidity ribs 30, 50 are arranged in the vehicular front-rear direction.

According to such an armrest 10, if the armrest 10 receives collision energy created by a side collision, a force is applied onto the protruded section 12 such that the upper section 13 and the lower section 15 are separated away from each other. The upper section 13 and the lower section 15 are deformed to be open widely while the intermediate section 14 serving as a support point. The protruded section 12 includes the ribs 30, 40, 50, which includes the low rigidity rib 40 and the high rigidity ribs 30, 50, on the vehicular exterior side of the intermediate section 14 connecting the upper section 13 and the lower section 15. If the protruded section 12 receives the collision energy, the low rigidity rib 40 is broken first and subsequently the high rigidity ribs 30, 50 will be broken. Namely, all of the ribs 30, 40, 50 are less likely to be broken at once. Therefore, the collision energy can be absorbed step by step.

In the above configuration, each of the high rigidity ribs 30, 50 has a perimeter length that extends from the upper section 13 to the lower section 15 via the intermediate section 14 and such a perimeter length is greater than that of the low rigidity rib 40. Namely, each of the vehicular interior side peripheral lengths L1 and L3 is longer than the vehicular interior side peripheral length L2. Each of the high rigidity ribs 30, 50 has a surface area that is greater than that of the low rigidity rib 40. Each of the high rigidity ribs 30, 50 has the width W1, W3 that is greater than the width W2 of the low rigidity rib 40. According to such an armrest 10, the high rigidity ribs 30, 50 have rigidity higher than that of the low rigidity rib 40 and are less likely to be broken compared to the low rigidity rib 40. Accordingly, the armrest 10 can absorb collision energy step by step by the ribs 30, 40, 50 that have different levels of rigidity.

In the above configuration, the holes 17, 18, 19 are below the protruded section 12. The armrest 10 can be mounted on the decoration panel 7 and the inner panel 9 through the holes 17, 18, 19. The ribs 30, 40, 50 are positioned corresponding to and above the respective holes 17, 18, 19 in the vertical direction. In the armrest 10 that is mounted on the decoration panel 7 and the inner panel 9, the ribs 30, 40, 50 of the protruded section 12 are positioned above and corresponding to the holes 17, 18, 19, respectively. Portions of the armrest 10 near the holes 17, 18, 19 are weaker than other portions and are easy to receive collision energy and easy to be broken by the collision energy. With such a configuration, if collision energy is applied to the decoration panel 7, the inner panel 9, or the armrest 10 due to a side collision, force is likely to be applied to the ribs 30, 40, 50 through the respective holes 17, 18, 19. Accordingly, the collision energy is likely to be absorbed by the ribs 30, 40, 50 effectively.

In the above configuration, the high rigidity ribs 30, 50 and the low rigidity ribs 40 are arranged alternately in the vehicular front-rear direction. If the high rigidity ribs or the low rigidity ribs are arranged on a certain section locally, all of the ribs in the certain section may be broken at once in case of a side collision. More specifically, if the high rigidity ribs are arranged only in the front section of the protruded section and the low rigidity ribs are arranged only in the rear section of the protruded section, all of the ribs in the front section or in the rear section may be broken at the same time in case of a side collision. Collision energy may not be absorbed by the armrest step by step. However, according to the armrest 10 of the present embodiment, the ribs are less likely to be broken at once in a certain section and collision energy can be absorbed step by step by the protruded section 12 as a whole.

The armrest 10 that is mounted in the door trim 1 of a vehicle according to the present embodiment includes the protruded section 12 that extends longitudinally in the vehicular front-rear direction and protrudes toward the vehicular interior side. The protruded section 12 includes the upper section 13 on the upper side, the lower section 15 on the lower side, and the intermediate section 14 that connects the upper section 13 and the lower section 15 on the vehicular interior side. The armrest 10 includes the ribs 30, 40, 50 on the vehicular exterior side of the intermediate section 14 so as to extend from the upper section 13 to the lower section 15 and extend over a space between the upper section 13, the intermediate section 14, and the lower section 15. The ribs 30, 40, 50 include the slits 33, 34, 43, 44, 53, 54 on the respective vehicular exterior side surfaces 32A, 42A, 52A of the vehicular exterior side peripheral edge portions 32, 42, 52.

According to such an armrest 10, if collision energy is applied to the armrest 10 due to a side collision, a force is applied to the protruded section 12 such that the upper section 13 and the lower section 15 are separated away from each other while the intermediate section 14 serving as a support point. The protruded section 12 includes the ribs 30, 40, 50 on the vehicular exterior side of the intermediate section 14 that connects the upper section 13 and the lower section 15. The ribs 30, 40, 50 include the slits 33, 34, 43, 44, 53, 54 on the respective vehicular exterior side surfaces 32A, 42A, 52A of the vehicular exterior side peripheral edge portions 32, 42, 52. According to such a configuration, the ribs 30, 40, 50 can start to be broken from the slits 33, 34, 43, 44, 53, 54 in case of a side collision. Specifically, the ribs 30, 40, 50 are broken and start to be separated from the upper section 13 and the lower section 15 from the slits 33, 34, 43, 44, 53, 54. Thus, collision energy is likely to be absorbed by the ribs 30, 40, 50.

In the above configuration, the chamfered edges are formed at the corners of the ribs 30, 40, 50 and the slits 33, 34, 43, 44, 53, 54 are formed at the upper and lower edge sections of the ribs 30, 40, 50. The upper and lower edge sections of the ribs 30, 40, 50 are spaced from the upper section 13 and the lower section 15 at the slits 33, 34, 43, 44, 53, 54. According to such an armrest 10, if a force is applied to the protruded section 12 such that the upper section 13 and the lower section 15 are separated away from each other due to a side collision, the ribs 30, 40, 50 are likely to start to be broken from the slits 33, 34, 43, 44, 53, 54 at borders between the ribs 30, 40, 50 and the upper section 13 and the lower section 15. Once the ribs 30, 40, 50 start to be broken from the slits 33, 34, 43, 44, 53, 54, the ribs 30, 40, 50 are further broken along the borders easily. Thus, the ribs 30, 40,

50 include the sections that allow to be broken easily such that the ribs 30, 40, 50 are likely to absorb collision energy effectively.

In the above configuration, the ribs 30, 30, 50 include recesses at the slits 33, 34, 43, 44, 53, 54 on the vehicular exterior side surfaces 32A, 42A, 52A. Each of the recesses extends in the direction perpendicular to the plate surface of the rib 30, 40, 50 or in a thickness direction of the rib 30, 40, 50 or the vehicular front-rear direction. According to such an armrest 10, if the upper section 13 and the lower section 15 of the protruded section 12 are deformed and moved so as to be spaced away from each other due to a side collision, the slits 33, 34, 43, 44, 53, 54 are likely to receive a force such that the armrest 10 is broken from the slits 33, 34, 43, 44, 53, 54 and the upper section 13 is separated from the ribs 30, 40, 50 and moved upward and the lower section 15 is separated from the ribs 30, 40, 50 and moved downward. Accordingly, cracks are easily created at the slits 33, 34, 43, 44, 53, 54 from the vehicular exterior side toward the vehicular interior side and the collision energy is likely to be absorbed by the ribs 30, 40, 50.

The rigidity of the ribs may be changed by changing a thickness of the ribs. For example, as illustrated in FIG. 2, a rib 60 that is thicker than the ribs 30, 40, 50 has rigidity higher than that of the ribs 30, 40, 50. According to the configuration including the ribs that have different thicknesses, the operations and effects same as those of the above configuration are obtained.

First Modification

Next, a first modification will be described with reference to FIG. 6. In the first modification, an armrest 110 includes ribs that have a configuration different from that of the above embodiment. In this modification, parts same as those of the above embodiment are provided with the same symbols and configurations, operations, and effects similar to those of the above embodiment will not be described.

Figure 6:
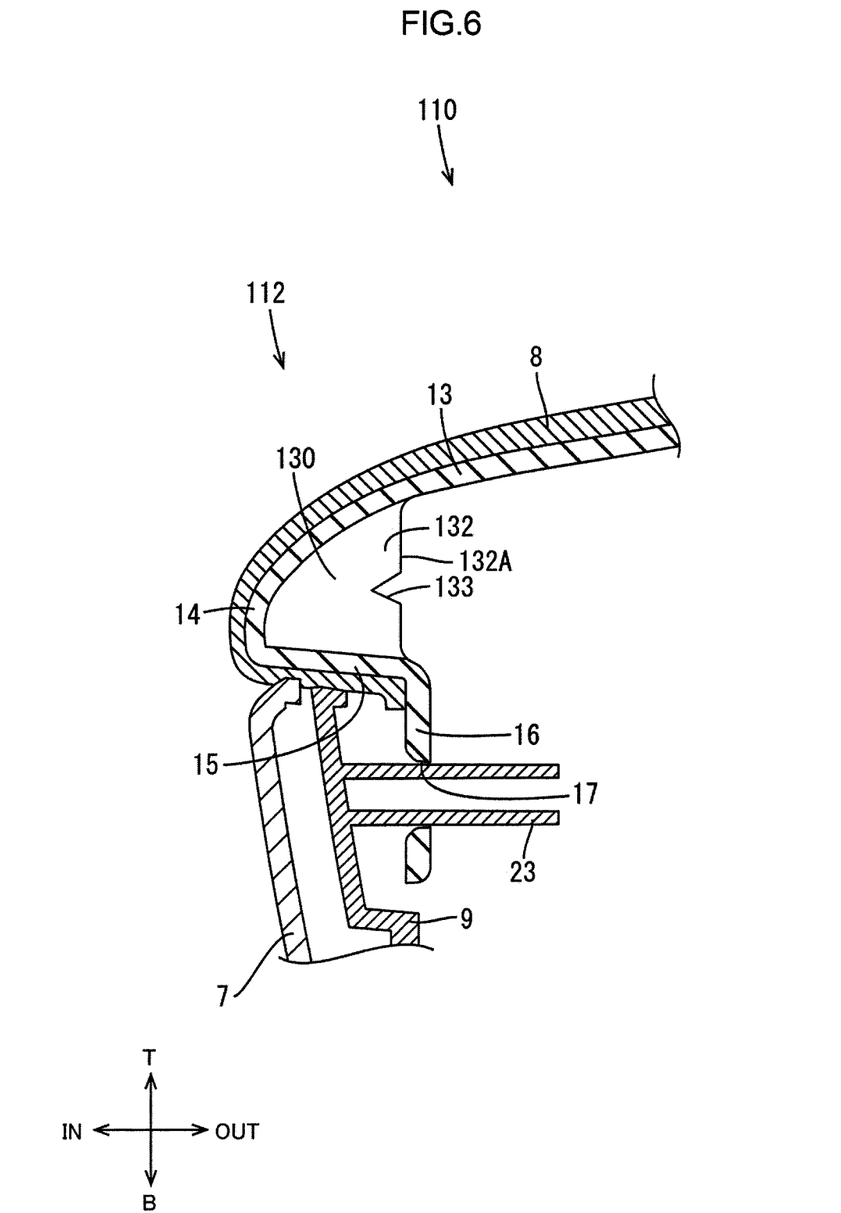
FIG. 6 is a cross-sectional view of an armrest according to a first modification.

As illustrated in FIG. 6, the armrest 110 includes a high rigidity rib 130 that is arranged in a front section of a protruded section 112. The rib 130 includes a slit 133 at a vehicular exterior side peripheral edge portion 132 and in a middle section thereof with respect to the vertical direction. The slit 133 is a recess that is recessed toward the vehicular interior side. The slit 133 is a groove that is formed on a vehicular exterior side surface 132A of the peripheral edge portion 132 and extends in the vehicular front-rear direction (a thickness direction of the rib 130). The armrest 110 further includes low rigidity ribs and other high rigidity ribs and the low rigidity ribs and other high rigidity ribs also have the slits that have a similar configuration as that of the slit 133 of the high rigidity rib 130.

Next, effects of the first modification will be described. The armrest 110 according to the first modification is mounted on the door trim of a vehicle. The armrest 110 includes the slit 133 in a middle section thereof with respect to the vertical direction. According to such an armrest 110, if the armrest 110 receives a force such that the upper section 13 and the lower section 15 of the protruded section 112 are spaced away from each other due to a side collision, the rib 130 is likely to be broken at the slit 133 and separated into pieces from the slit 133. Namely, the rib 130 is broken at the middle section thereof. Thus, the rib 130 includes a portion from which the rib 130 easily starts to be broken and therefore, collision energy is easily absorbed by the rib 130.

Second Modification

Figure 7:
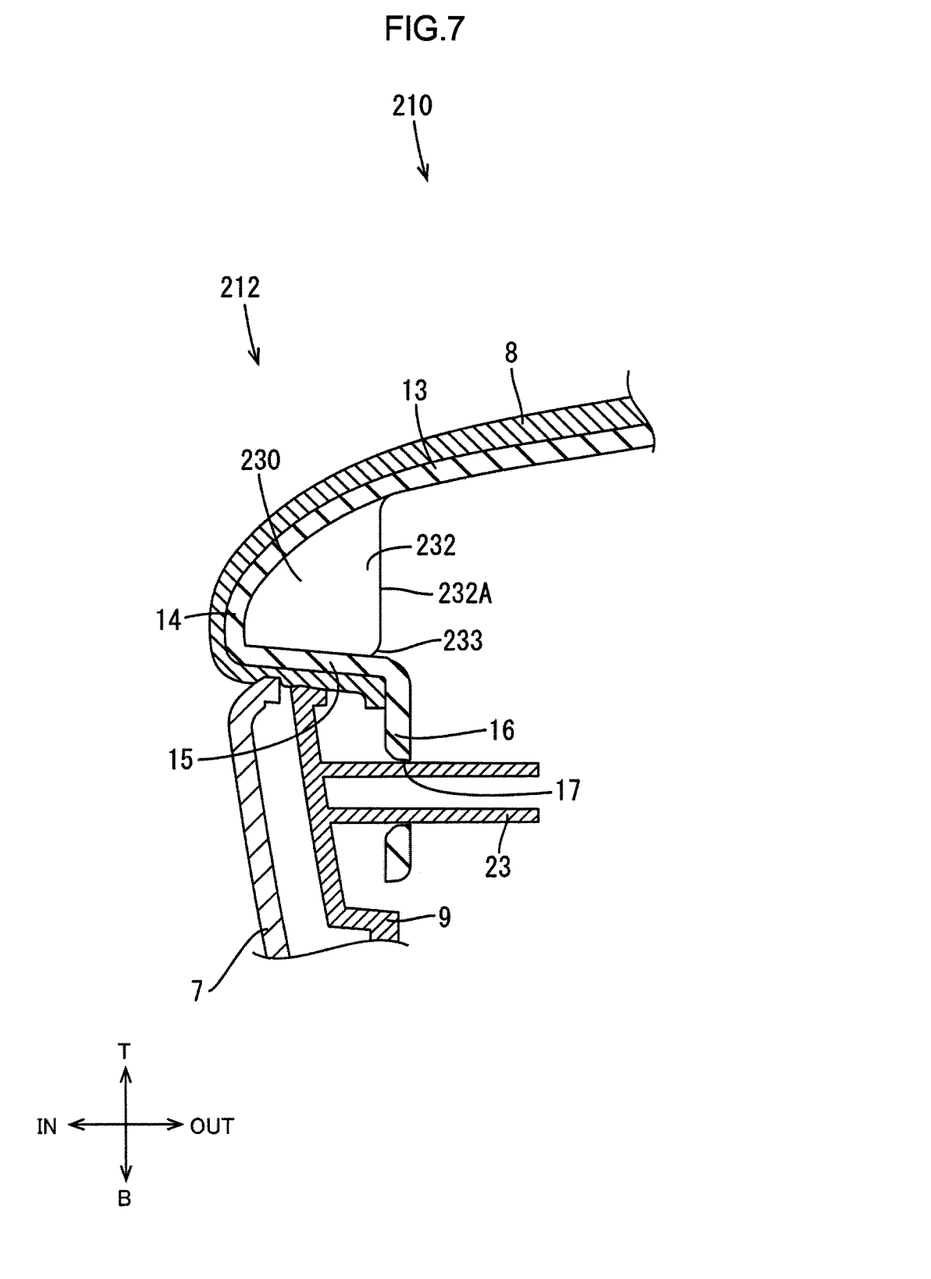
FIG. 7 is a cross-sectional view of an armrest according to a second modification.

Next, a second modification will be described with reference to FIG. 7. In the second modification, an armrest 210 includes a rib that has a configuration different from that of the ribs of the above embodiment and the first modification. In this modification, parts same as those of the above embodiment are provided with the same symbols and configurations, operations, and effects similar to those of the above embodiment will not be described.

The armrest 210 includes a high rigidity rib 230 that is arranged in a front section of a protruded section 212. As illustrated in FIG. 7, the rib 230 includes a chamfered edge at a lower edge portion of a vehicular exterior side peripheral edge portion 232 thereof. A slit 233 is formed between the chamfered edge and the lower section 15 of the protruded section 212. The slit 233 is recessed toward the vehicular interior side. The slit 233 is formed between the chamfered edge and the lower section 15 and on a vehicular exterior surface 232A of the peripheral edge portion 232 in a groove form that extends in the vehicular front-rear direction. The armrest 210 further includes low rigidity ribs and other high rigidity ribs and the low rigidity ribs and other high rigidity ribs also have slits that have a similar configuration as that of the slit 233 of the high rigidity rib 230.

Next, effects of the second modification will be described. The armrest 210 according to the second modification is mounted on the door trim of a vehicle. In the armrest 210, the rib 230 includes the slit 233 in a lower edge section thereof. According to such an armrest 210, if the armrest 210 receives a force such that the upper section 13 and the lower section 15 of the protruded section 212 are spaced away from each other due to a side collision, the rib 230 is likely to be broken at the slit 233 and start to be separated from the lower section 15 at the slit 233. Thus, the rib 230 is easily broken at a border between the rib 230 and the lower section 15. The rib 230 includes a portion from which the rib 230 easily starts to be broken and therefore, collision energy is easily absorbed by the rib 230.

Other Embodiments

The present technology is not limited to the description as described above with reference to the drawings. For example, the present technology may include following embodiments.

(1) Other than the above embodiments and modifications, the configurations of the high rigidity ribs and the low rigidity ribs may be altered as appropriate. In the above embodiments and the modifications, the high rigidity rib and the low rigidity rib have different vehicular interior side peripheral lengths that extend from the upper section to the lower section. However, it is not limited thereto. For example, the ribs may have different areas, different distances from a protruded end section to a vehicular exterior side end section, or different thicknesses. In such a configuration, the rib that has a greater area, a greater distance, or a greater thickness is the high rigidity rib.

(2) Other than the above embodiments and modifications, types of ribs may be altered as appropriate. In the above embodiments and modifications, the ribs include the low rigidity ribs and the high rigidity ribs that have higher rigidity than the low rigidity ribs. However, they are not limited thereto. For example, the ribs may include a low rigidity rib, an intermediate rigidity rib that has higher rigidity than the low rigidity rib, and a high rigidity rib that has higher rigidity than the intermediate rigidity rib. The ribs may further include other type of ribs that have different rigidity. In such a configuration, collision energy can be absorbed by the different types of ribs step by step with three or more steps.

(3) Other than the second modification, a position of the slit may be altered as appropriate. In the second modification, the rib 230 includes the slit 233 at the lower edge of the vehicular exterior side peripheral edge portion 232; however, it is not limited thereto. For example, the rib 230 may include the slit at an upper edge of the vehicular exterior peripheral edge portion 232.

(4) In the above embodiments and the modifications, the armrest for a vehicle is used for a vehicle. Other than that, the armrest may be applied to vehicles on the ground such as a train or amusement park ride, flying vehicles such as an airplane or a helicopter, and marine vehicles or undersea vehicles such as a ship or a submarine.

The invention claimed is:

1. An armrest mounted in a door trim of a vehicle having a vehicular interior surface, the armrest comprising:
    a protruded section protruded from the vehicular interior surface toward a vehicular interior side and extending in a vehicular front-rear direction, the protruded section including
        an upper section disposed on an upper side,
        a lower section disposed on a lower side,
        an intermediate section disposed between the upper section and the lower section and connecting the upper section and the lower section on a vehicular interior side; and
    ribs disposed on a vehicular exterior side with respect to the intermediate section and arranged in the vehicular front-rear direction and each of which extends from the upper section to the lower section, the ribs including low rigidity ribs and high rigidity ribs that are arranged in the vehicular front-rear direction, the high rigidity ribs having rigidity higher than rigidity of the low rigidity ribs,
    wherein the high rigidity ribs and the low rigidity ribs are arranged alternately in the vehicular front-rear direction, such that a low rigidity rib is adjacent to and positioned between two high rigidity ribs having rigidity higher than rigidity of the low rigidity rib.

2. The armrest according to claim 1, wherein each of the high rigidity ribs and each of the low rigidity ribs has a perimeter length that extends along the upper section, the intermediate section, and the lower section, and the perimeter length of each of the high rigidity ribs is larger than the perimeter length of each of the low rigidity ribs.

3. The armrest according to claim 1, further comprising a mount section disposed below the lower section and with which the armrest is mountable on another component, wherein
    the ribs are arranged above the mount section.

4. The armrest according to claim 1, wherein each of the high rigidity ribs and each of the low rigidity ribs is a plate member having a plate surface area and the plate surface area of each of the high rigidity ribs is larger than the plate surface area of each of the low rigidity ribs.

5. The armrest according to claim 1, wherein each of the high rigidity ribs and each of the low rigidity ribs is a plate member having a width in a vehicular width direction and the width of each of the high rigidity ribs is greater than the width of each of the low rigidity ribs.

6. An armrest mounted in a door trim of a vehicle having a vehicular interior surface, the armrest comprising:
    a protruded section protruded from the vehicular interior surface toward a vehicular interior side and extending in a vehicular front-rear direction, the protruded section including
        an upper section disposed on an upper side,
        a lower section disposed on a lower side,
        an intermediate section disposed between the upper section and the lower section and connecting the upper section and the lower section on a vehicular interior side; and
    ribs disposed on a vehicular exterior side with respect to the intermediate section and arranged in the vehicular front-rear direction and each of which extends from the upper section to the lower section, the ribs including a low rigidity rib and a high rigidity rib that are arranged in the vehicular front-rear direction, the high rigidity rib having rigidity higher than rigidity of the low rigidity rib,
    wherein each of the high rigidity rib and the low rigidity rib is a plate member having a thickness and the thickness of the high rigidity rib is greater than the thickness of the low rigidity rib.

7. The armrest according to claim 1, wherein the ribs are formed integrally with the protruded section.

8. The armrest according to claim 3, wherein
    the mount section includes mount holes through which the armrest is mountable on another component, and
    the ribs are arranged right above the respective mount holes.

9. The armrest according to claim 1, wherein
    the protruded section includes a recessed section that is surrounded by the upper section, the intermediate section and the lower section and that has a space in the recessed section on the vehicular exterior side with respect to the intermediate section, and
    the ribs are arranged in the space of the recessed section.

10. The armrest according to claim 1, wherein each of the ribs is a plate member having a vehicular interior side peripheral edge portion and the vehicular interior side peripheral edge portion is continuous from the upper section, the intermediate section, and the lower section.

11. A armrest mounted in a door trim of a vehicle having a vehicular interior surface, the armrest comprising:
    a protruded section protruded from the vehicular interior surface toward a vehicular interior side and extending in a vehicular front-rear direction, the protruded section including
        an upper section disposed on an upper side,
        a lower section disposed on a lower side,
        an intermediate section disposed between the upper section and the lower section and connecting the upper section and the lower section on a vehicular interior side; and
    ribs disposed on a vehicular exterior side with respect to the intermediate section and arranged in the vehicular front-rear direction and each of which extends from the upper section to the lower section, the ribs including a low rigidity rib and a high rigidity rib that are arranged in the vehicular front-rear direction, the high rigidity rib having rigidity higher than rigidity of the low rigidity rib,
    wherein each of the ribs is a plate member having a vehicular exterior side peripheral edge portion and the vehicular exterior side peripheral edge portion includes a slit.

12. The armrest according to claim 11, wherein the slit is provided at an upper portion or a lower portion of the vehicular exterior side peripheral edge portion.

13. The armrest according to claim 11, wherein the slit includes slits that are provided at an upper portion and a lower portion of the vehicular exterior side peripheral edge portion, respectively.

14. The armrest according to claim 12, wherein the vehicular exterior side peripheral edge portion has a chamfered edge at the upper portion or the lower portion of the vehicular exterior side peripheral edge portion and the slit is provided between the chamfered edge and the upper section or the lower section.

15. The armrest according to claim 11, wherein the slit is provided at a middle portion of the vehicular exterior side peripheral edge portion.

16. The armrest according to claim 11, wherein each of the ribs includes a vehicular interior side peripheral edge portion and the vehicular interior side peripheral edge portion is continuous from the upper section, the intermediate section, and the lower section.

* * * * *